US012269280B2

(12) United States Patent
Nakai et al.

(10) Patent No.: US 12,269,280 B2
(45) Date of Patent: Apr. 8, 2025

(54) NAIL PRINTING APPARATUS AND CONTROL METHOD OF NAIL PRINTING APPARATUS

(71) Applicant: CANON KABUSHIKI KAISHA, Tokyo (JP)

(72) Inventors: Soma Nakai, Tokyo (JP); Toshiaki Tokisawa, Kanagawa (JP); Yuka Tani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 17/706,728

(22) Filed: Mar. 29, 2022

(65) Prior Publication Data

US 2022/0312929 A1 Oct. 6, 2022

(30) Foreign Application Priority Data

Apr. 5, 2021 (JP) ................................ 2021-064094

(51) Int. Cl.
*B41J 3/407* (2006.01)
*A45D 29/00* (2006.01)

(52) U.S. Cl.
CPC ......... *B41J 3/40731* (2020.08); *B41J 3/4073* (2013.01); *A45D 2029/005* (2013.01)

(58) Field of Classification Search
CPC ..... B41J 3/40731; B41J 3/4073; A45D 29/00; A45D 34/04; A45D 44/005; A45D 2029/005; G06K 15/021; G06K 15/22
See application file for complete search history.

(56) References Cited

U.S. PATENT DOCUMENTS

| | | | | |
|---|---|---|---|---|
| 8,477,162 B1 * | 7/2013 | Martell | ...................... | B41J 2/32 347/171 |
| 2012/0147113 A1 * | 6/2012 | Yamasaki | ................ | B41J 3/407 347/104 |
| 2017/0181521 A1 * | 6/2017 | Yamasaki | ............. | A45D 29/00 |

(Continued)

FOREIGN PATENT DOCUMENTS

WO 2001091598 A1 12/2001

OTHER PUBLICATIONS

Yuka Tani et al., U.S. Appl. No. 17/706,670, filed Mar. 29, 2022.

(Continued)

*Primary Examiner* — Jason S Uhlenhake
(74) *Attorney, Agent, or Firm* — VENABLE LLP

(57) ABSTRACT

A nail printing apparatus prints an image on a nail, and includes a finger placement unit capable of lifting and lowering on which a finger corresponding to the nail is placed, with the finger placement unit having a fixing unit to fix the finger. The fixing unit includes a pressing unit to cover at least a part of the finger, and a pushing-up unit to push up the finger until the finger contacts the pressing unit. In addition, an adjustment unit adjusts an inclination in a height direction of a tip side and a bottom side of a surface of the nail corresponding to the finger placed on the finger placement unit. The adjustment unit includes a fingertip placement unit arranged on a side closer to a fingertip than the fixing unit, and a fingertip lifting/lowering unit to lift/lower the fingertip placement unit.

11 Claims, 13 Drawing Sheets

(56) References Cited

U.S. PATENT DOCUMENTS

2018/0084889 A1* 3/2018 Hori ......................... B41J 11/58

OTHER PUBLICATIONS

Keisuke Arita et al., U.S. Appl. No. 17/690,113, filed Mar. 9, 2022.
Naoya Ogawa et al., U.S. Appl. No. 17/695,887, filed Mar. 16, 2022.
Hirokazu Kameda, U.S. Appl. No. 17/701,811, filed Mar. 23, 2022.

* cited by examiner

NAIL PRINTING APPARATUS AND CONTROL METHOD OF NAIL PRINTING APPARATUS

BACKGROUND OF THE INVENTION

Field of the Invention

The present disclosure relates to a nail printing apparatus.

Description of the Related Art

In recent years, a nail printing apparatus that prints a nail design on a fingernail is known. The nail printing apparatus such as this performs printing on a nail by arranging the printing-target nail at a position at which printing is possible. International Laid Open No. 2001/091598 has disclosed a technique to move a nail to an optimum distance from a print head by using a vertically moving mechanism and a height detection unit.

SUMMARY OF THE INVENTION

However, in a case where the nail surface is inclined with respect to the print head, it is not a sufficient adjustment only by moving the nail vertically. The nail shape and the finger shape are different for different persons and for different fingers, and therefore, in order to place the nail in a posture suitable to printing, it becomes necessary to adjust the inclination of the nail surface, not only the nail height.

Consequently, in view of the above-described problem, an object of one embodiment of the present invention is to provide a technique to adjust the inclination of the nail surface.

One embodiment of the present invention is a nail printing apparatus that prints an image on a nail, the nail printing apparatus including: a finger placement unit capable of lifting and lowering on which a finger corresponding to the nail is placed; and an adjustment unit configured to adjust an inclination in a height direction of a tip side and a bottom side of a surface of the nail corresponding to the finger placed on the finger placement unit.

Further features of the present invention will become apparent from the following description of exemplary embodiments with reference to the attached drawings.

DESCRIPTION OF THE EMBODIMENTS

In the following, with reference to the drawings, preferred embodiments of the present invention are explained. The dimension, material, shape, and relative arrangement thereof of the components described below should be changed appropriately in accordance with the configuration of the apparatus to which the present invention is applied, various conditions and the like. Consequently, it is not intended to limit the scope of the present invention to the following description. Further, it is also possible to apply the commonly known technique and publicly known technique in the technical field of the present invention to the configuration and the process, not shown schematically or described particularly. Furthermore, there is a case where duplicated explanation is omitted.

First Embodiment

<Configuration of Nail Printing Apparatus>

Figure 1:
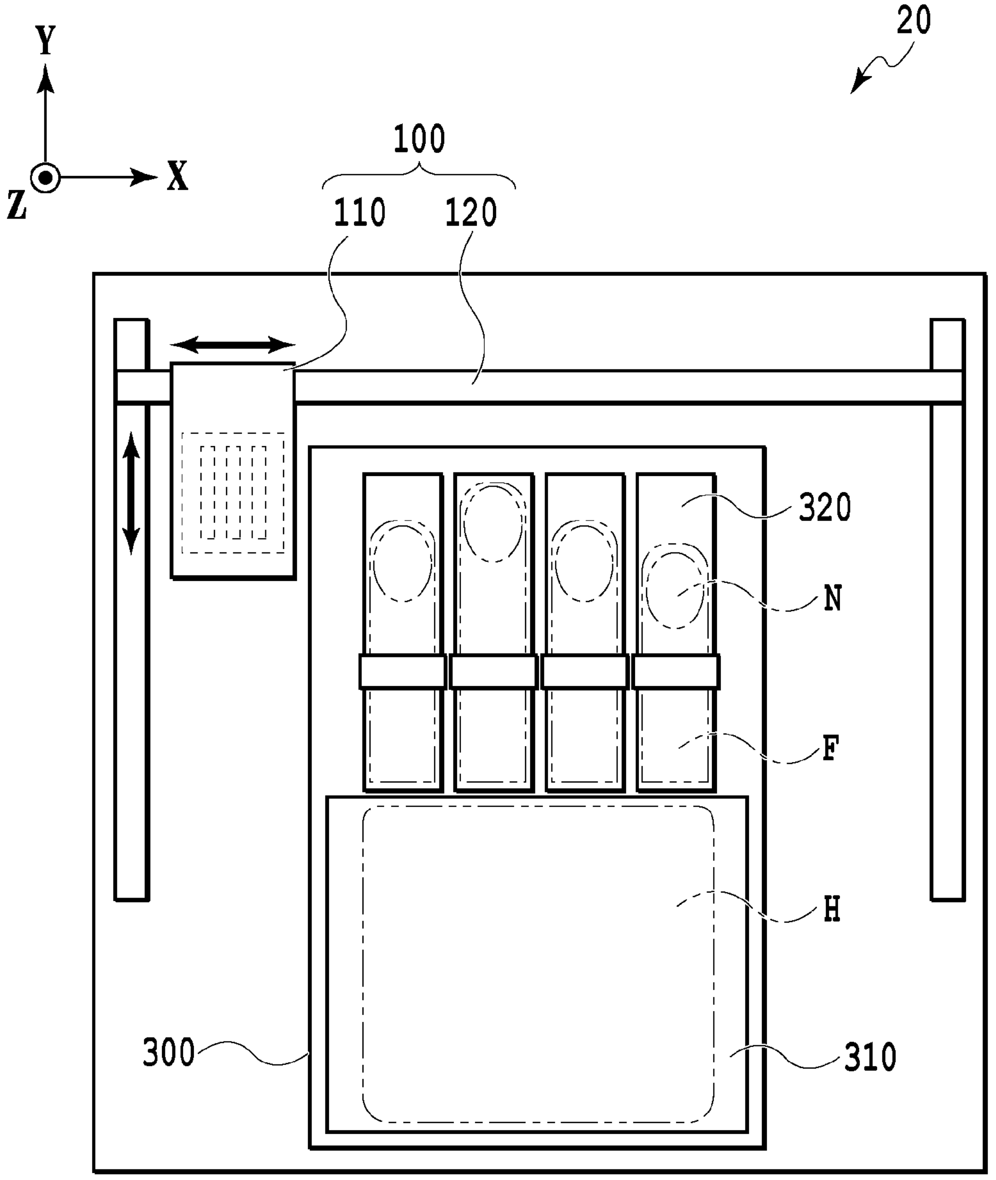
FIG. 1 is a top diagram of a nail printing apparatus in a first embodiment.
Figure 2:
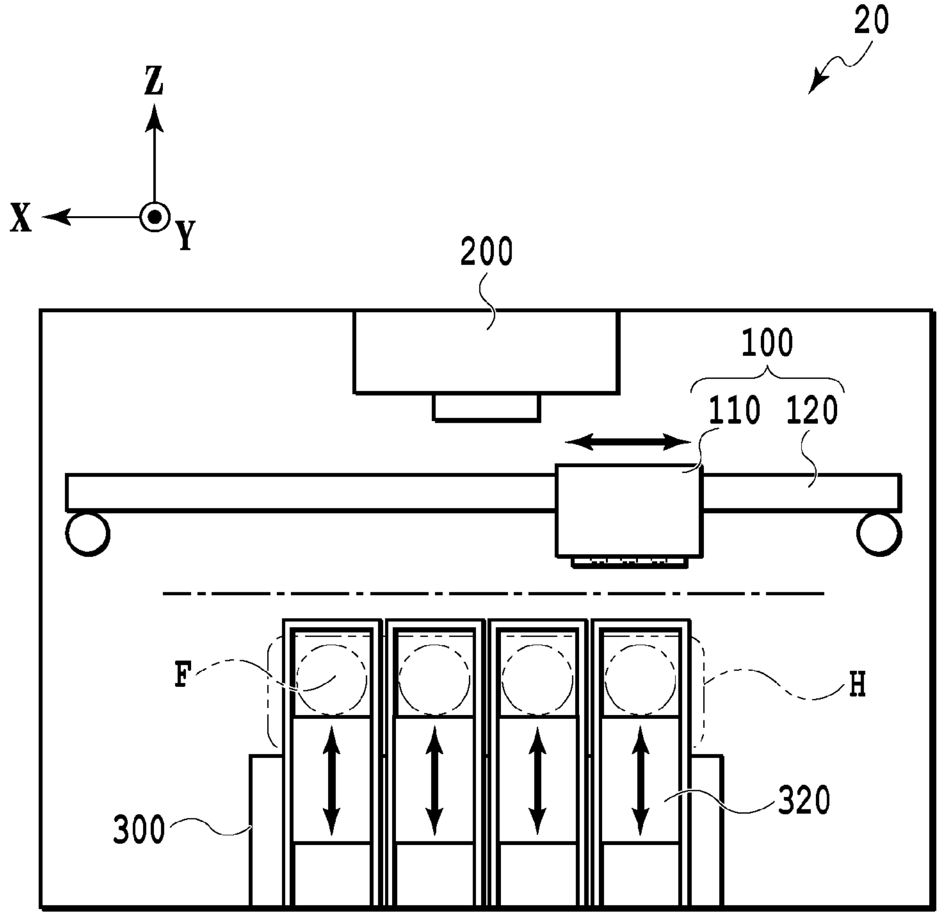
FIG. 2 is a front diagram of the nail printing apparatus in the first embodiment.
Figure 3:
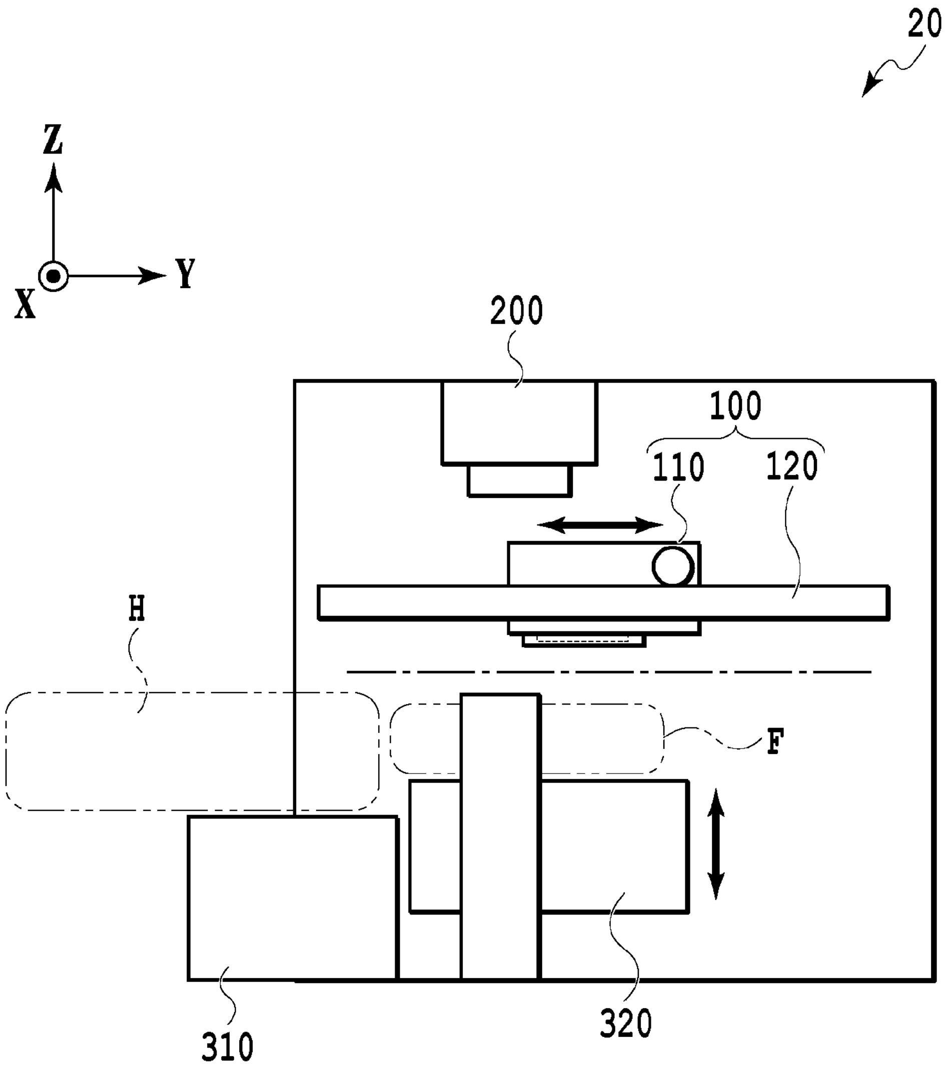
FIG. 3 is a side diagram of the nail printing apparatus in the first embodiment.

In the following a configuration of a nail printing apparatus in the present embodiment is explained by using FIG. 1 to FIG. 3. FIG. 1 is a top diagram showing a configuration outline of the nail printing apparatus in the present embodiment. FIG. 2 is a front diagram showing a configuration outline of the nail printing apparatus in the present embodiment. FIG. 3 is a side diagram showing a configuration outline of the nail printing apparatus in the present embodiment FIG. 1 to FIG. 3 show an example of a nail printing apparatus 20 (in the following, described as printing apparatus 20) in the state where a casing, not shown schematically, is removed. In FIG. 1 to FIG. 3, it is assumed that a +Y-direction indicates the back side, a −Y-direction indicates the front side, a +X-direction indicates the right side, a −X-direction indicates the left side, a +Z-direction indicates the upper side, and a −Z-direction indicates the lower side. AZ-axis corresponds to the gravity direction (also called height direction).

Figure 5:
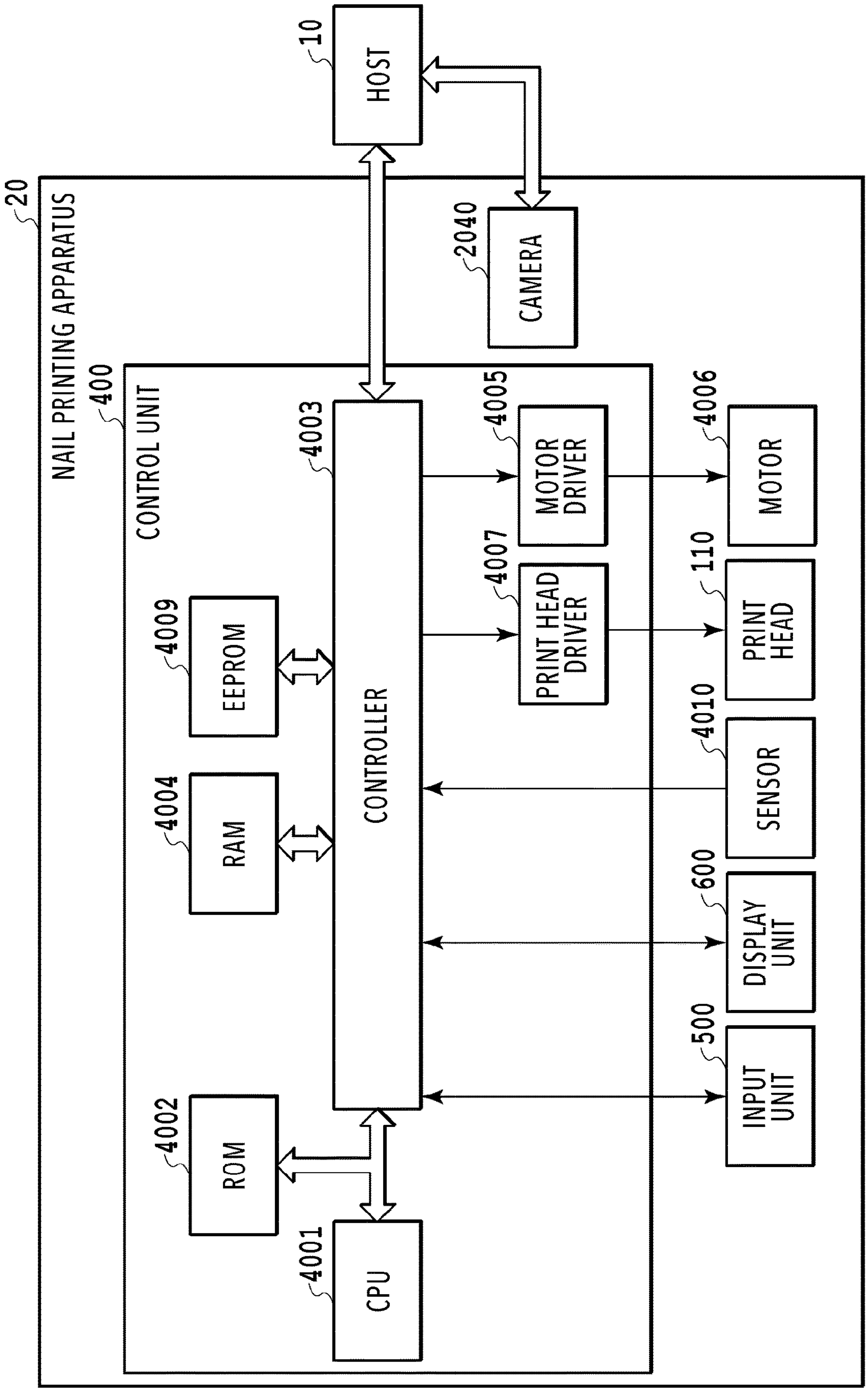
FIG. 5 is a block diagram showing a hardware configuration of the nail printing apparatus in the first embodiment.

The printing apparatus 20 in the present embodiment has a printing unit 100, a nail information obtaining unit 200, and a hand placement unit 300, which are shown in FIG. 1 to FIG. 3, and a control unit 400, an input unit 500, and a display unit 600, which are shown in FIG. 5, to be described later.

<<Printing Medium H>>

Although a printing medium H is not a component that constitutes a part of the printing apparatus 20 in the present embodiment, the printing medium His explained in the following. The printing medium H has at least one or more nails N. In the present embodiment, the printing medium is a hand, but the printing medium is not limited to a hand, and it may also be possible to take a nail chip and a nail seal as a printing medium, in addition to a hand and a foot.

In order to improve print quality, it is desirable to apply in advance a base or a primer to a nail and dry the nail. Further, in order to prevent printing being performed on a position other than the nail, it may also be possible to perform masking processing for the periphery of the nail. Furthermore, it is possible to keep the quality of printing by applying a top coating after printing.

<<Printing Unit 100>>

The printing unit 100 is a mechanism that performs drawing on a nail. The printing unit 100 comprises a print head 110 and a scanning unit 120. The printing unit 100 is controlled by the control unit 400 (see FIG. 5), to be described later, and ejects ink as a liquid in accordance with a print pattern.

The print head 110 performs printing while moving in the X-direction by the scanning unit 120. However, in a case where the length of a nail in the Y-direction exceeds the nozzle width (length in Y-direction) of the print head 110, the scanning unit 120 is moved further in the Y-direction and printing is performed by dividing the printing into a plurality of times.

By keeping the distance between the print head 110 and a nail appropriately, it is possible to improve the print quality of the printing unit 100. Because of this, as will be described later, in the present embodiment, a height adjustment mechanism is provided in the hand placement unit 300, but it may also be possible to provide the height adjustment mechanism in the printing unit 100. In the following, a surface distant from the nozzle surface of the print head in the ink ejection direction by a distance suitable to printing is called a printing surface S.

<<Nail Information Obtaining Unit 200>>

The nail information obtaining unit 200 shown in FIG. 2 or FIG. 3 measures the position and shape of a nail and sends obtained information relating to the nail (referred to as nail information) to the control unit 400. The nail information may be three-dimensional information including nail height information or may be two-dimensional information obtained by performing projection onto the printing surface S. The nail information obtaining unit 200 has an image obtaining unit and a nail height obtaining unit.

The image obtaining unit is a unit configured to perform image capturing of a nail and it is possible to use an RGB camera or the like provided above the printing area. By using a plurality of cameras, performing image capturing while moving cameras, and so on, it is possible to capture the entire printing area. Further, by extracting the contour of a nail from a captured image, nail shape information is obtained and a print pattern is created based on the shape information.

The nail height obtaining unit is a unit configured to obtain nail height information. To a nail, a base coat or the like is applied in advance, and therefore, it is desirable for the nail height obtaining unit to be a contactless type unit. More specifically, it is possible to use a camera installed in the finger side direction, a distance sensor installed above the nail, and the like. Further, it may also be possible to arrange a laser on the printing surface S and detect the cutoff of the laser. It may also be possible for the nail height obtaining unit to obtain height information on the entire printing area or obtain the ridgeline shape obtained by projecting the printing-target nail and finger in the side direction. Further, it may also be possible for the nail height obtaining unit to obtain the height of one point in the vicinity of the uppermost portion of the printing-target nail. It is possible to use the nail height information obtained by the nail height obtaining unit for the height adjustment of the nail and the printing surface S, the inclination adjustment of the nail surface, the emergency stop for preventing collision with the print head 110, and the like.

<<Hand Placement Unit 300>>

Figure 4:
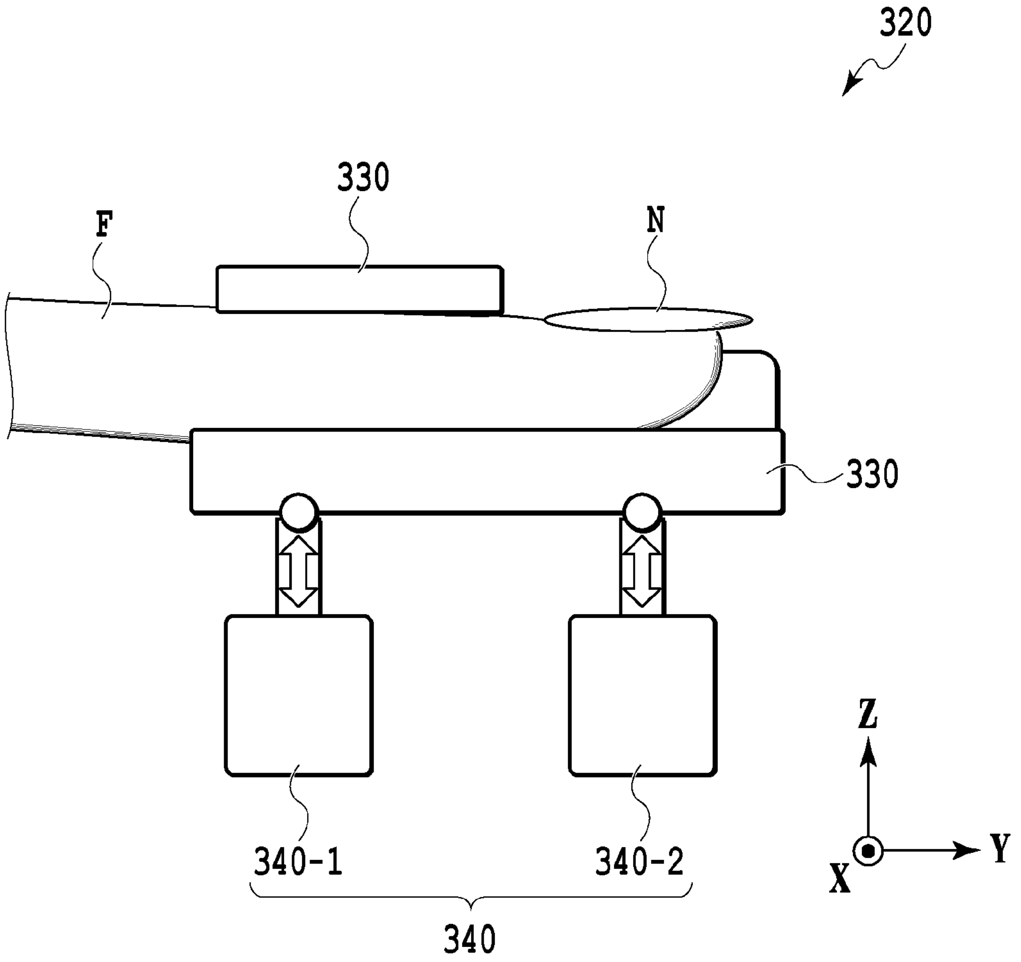
FIG. 4 is a schematic diagram showing a configuration of a finger placement unit in the first embodiment.

The hand placement unit 300 is a mechanism for placing the printing medium H on the apparatus in a stable posture. As shown in FIG. 1 to FIG. 3, the hand placement unit 300 has a palm placement unit 310 on which a hand is placed and a finger placement unit 320 on which a finger is placed. As shown in FIG. 4, the finger placement unit 320 has a finger fixing unit 330 and a nail posture adjustment unit 340.

The finger fixing unit 330 is a unit for fixing a finger so that the printing-target nail does not move. As the finger fixing unit 330, any unit can be used, but in a case of fixing a finger by pinching it, it is desirable to press the finger by using an elastic member that corresponds to thicknesses of a variety of fingers and further which does not cause a pain of the finger. Further, in order to prevent the nail from moving during printing, it is desirable to fix the finger fixing unit 330 at a place close to the nail. Because of this, the finger placement unit 320 comprises a finger insertion reference for a user of the printing apparatus to place the finger at an appropriate position. It may also be possible for a fixing unit configured to fix a finger to have the finger insertion reference or for a nail inclination adjustment unit configured to adjust the nail inclination to have the finger insertion reference. Further, it may also be possible for the printing apparatus 20 to have a detection unit configured to detect that the finger is inserted up to the finger insertion reference. Furthermore, in order to remove static electricity from the hand from the standpoint of safety, some place of the finger placement unit 320 is grounded.

It is not necessary for the finger fixing unit 330 to fix the entire finger and it is not necessarily required for the finger to be restrained by the finger fixing unit 330. For example, the finger fixing unit 330 may be a support table that comes into contact with the surface on the opposite side of the surface on the fingernail side. However, in a case where the finger is not restrained, it is necessary to guarantee that the finger does not move by another method. As a unit configured to guarantee that the finger does not move, for example, it is possible to use the nail height obtaining unit described previously. Alternatively, it may also be possible for a user of the printing apparatus to determine that the finger does not move.

The nail posture adjustment unit 340 is a unit configured to adjust the inclination and height of a finger that is fixed by the finger fixing unit 330 and includes a first nail posture adjustment unit 340-1 and a second nail posture adjustment unit 340-2. The nail posture adjustment unit 340 includes a nail inclination adjustment unit configured to adjust the inclination of a nail and a nail height adjustment unit configured to adjust the height of a nail. It may also be possible for the nail inclination adjustment unit and the nail height adjustment unit to be configured separately or configured integrally. Further, the nail posture adjustment unit 340 is caused to have a configuration that can be stationary and has a safety mechanism that stops the operation of the nail posture adjustment unit 340 or lowers the nail posture adjustment unit 340 in a case where a large load is imposed on the finger. That is, the printing apparatus 20 has a measuring unit configured to measure the load that is imposed on the nail and in a case where the amount of load that is obtained from the measuring unit exceeds a predetermined threshold value, the nail posture adjustment unit 340 stops its operation or lowers by the safety mechanism. The nail posture adjustment unit 340 adjusts the posture of the nail based on the nail information obtained from the nail information obtaining unit 200 described previously. The nail posture adjustment unit 340 has a role to move the finger tip at least in the Z-direction and is driven by a motor, not shown schematically. In the present embodiment, after adjusting the inclination of the nail, the height of the nail is adjusted. However, it may also be possible to change the sequence of the nail inclination adjustment in accordance with the shape of the finger and nail and it is desirable to adjust the posture of the nail appropriately in accordance with the printing apparatus 100.

<<Control Unit 400>>

FIG. 5 is a block diagram showing the hardware configuration of the control unit 400 of the printing apparatus 20. The control unit 400 has a central processing unit (CPU) 4001. The CPU 4001 performs control of each mechanism in the printing apparatus 20 via a controller 4003 in accordance with various programs stored in a ROM 4002. At that time, a RAM 4004 is used as a storage area that temporarily stores various kinds of data, or a work area at the time of performing arbitrary processing. Further, the CPU 4001 performs image processing for converting image data received from a host 10 into print data that the printing apparatus 20 can print. Then, based on the print head, the printing apparatus 20 prints an image on the printing medium H by driving the print head 110 via a print head driver 4007 as well as driving a motor 4006 via a motor driver 4005. In FIG. 5, in order to make understanding easy, the various motors in the printing apparatus 20 are together shown as the motor 4006 and the motor drivers that drive each motor are together shown as the motor driver 4005.

Further, the control unit 400 has an electrically writable EEPROM 4009. In the EEPROM 4009, various setting values and data that is updated, and the like are stored and the data such as this is used as control parameters by the controller 4003 and the CPU 4001. In FIG. 5, in order to make understanding easy, various sensors, such as an encoder sensor and the nail height obtaining unit described previously, which are provided in the printing apparatus 20 are together shown as a sensor 4010. The CPU 4001 increments the value that is stored in a ring buffer of the RAM 4004 by using count information obtained by, for example, the encoder sensor counting slits.

Further, the printing apparatus 20 has a camera 2040 connected with the host 10. The camera 2040 constitutes the image obtaining unit described previously. The camera 2040 performs image processing relating to nail position information in the host 10 based on the image information obtained by the image obtaining unit. The camera 2040 may be a camera that is installed in the nail printing apparatus 20 or, for example, it may also be possible for a user to separately install a smartphone with camera function and the like.

<<Input Unit 500>>

The input unit 500 is a unit for a user to input information to the printing apparatus 20. As the input unit 500, for example, it is possible to use a keyboard, a mouse, a touch panel, a dial, a button and the like. It is possible for a user to perform modification of nail shape information, selection of a design that is printed, and so on.

<<Display Unit 600>>

The display unit 600 is a unit configured to present information, such as the situation of printing and the situation of the printing apparatus 20, to a user and capable of displaying the states of a nail before and after printing. As the display unit 600, for example, it is possible to use an arbitrary device, such as a liquid crystal display, a plasma display, an organic EL display, and an FED. Further, it is desirable for the display unit 600 to be arranged together with the input unit 500 described previously and it may also be possible to configure the input unit 500 and the display unit 600 as one unit by using a touch panel and the like. The input unit 500 and the display unit 600 may be those installed in the nail printing apparatus 20 or those installed separately in a smartphone or a computer.

<Nail Printing Processing>

In the following, nail printing processing that is performed in the printing apparatus 20 is explained by using FIG. 6.

It is assumed that selection of a print design is completed at the point in time of the start of the nail printing processing shown in the following. The information on the print design may specifically include information on which finger printing is performed for, in addition to the image data that is printed.

Further, as the preparation before printing is performed actually, it is desirable to perform the operation check at the time of activation of the printing apparatus. As the operation check, the drive check of the scanning unit, the ejection test of the print head, the check of the amount of remaining ink and the like are performed and exchange of the print head with another or cleaning of the print head is performed as needed.

At step S101, a user of the printing apparatus 20 places the printing medium H (that is, hand) on the hand placement unit 300. At this time, it is desirable for a user to be able to check the state of the printing range on the display unit 600 so that the printing medium H is placed appropriately, After the placement of the printing medium H is completed, it may also be possible for a user to advance to the next process by giving instructions via the input unit 500, but it may also be possible for the user to advance to the next process after detecting the placement state of the hand by the sensor of the hand placement unit 300 or the nail information obtaining unit 200. Further, in a case where the placement state of the printing medium H is inappropriate, the printing apparatus 20 notifies the user of that by using the display unit 600 and presents the method of placing the printing medium H again so that the printing medium H is placed appropriately. In the following, "step S-" is abbreviated to "S-".

At S102, the CPU 4001 performs processing to adjust the position and posture of the nail placed on the hand placement unit 300. The processing that is performed at this step is called "nail posture adjustment processing". The nail posture adjustment processing will be described later (see FIG. 7).

At S103, the CPU 4001 creates a print pattern. Specifically, the CPU 4001 enlarges/reduces/rotates/trims the print design for the nail shape and further performs density adjustment in accordance with the posture of the nail. Then, after the density adjustment, the CPU 4001 displays a preview of the print pattern that is presented to a user. By displaying the preview in which the print pattern is attached to the nail portion of the image obtained by the image obtaining unit, it is possible for a user to clearly imagine the printing results.

At S104, the CPU 4001 performs printing processing for the nail by using the printing unit 100. During the execution of the printing processing at this step, the CPU 4001 performs control so that the portion of the finger and nail of the user for which printing is not performed and the printing unit 100 do not come into contact with each other based on the detection results of the sensor of the hand placement unit 300 or the nail information obtaining unit 200. It may also be possible to perform printing on the nail for each finger or perform printing for all the fingers at the same time.

At S105, the CPU 4001 determines whether printing is performed on all the nails. In a case where the determination results at this step are affirmative, the nail printing processing is terminated. On the other hand, in a case where the determination results at this step are negative, the processing moves to S102 and the printing processing for the nail on which printing is not performed is continued.

<Nail Posture Adjustment Processing>

In the following, details of the nail posture adjustment processing (S102 in FIG. 6) in the present embodiment are explained by using FIG. 7.

At S1021, a user fixes a finger by the finger fixing unit 330 described previously. In order to fix the finger firmly, it is desirable to fix the finger up to beyond the first joint. Further, as the fixing member, it is desirable to use an elastic member, a fluid and the like to avoid a pain of a user. In a case where a hard fixing member is used, it is possible to mitigate the pain of the user by providing a curvature in accordance with the shape of the finger to the placement surface.

At S1022 to S1023, the CPU 4001 adjusts the inclination and position of the nail so that the posture is appropriate for printing. The "appropriate posture" described here means the posture in which the entire nail is put in close proximity to the printing surface S in the range where the finger and the nail do not come into contact with the printing unit 100. In the following, S1022 and S1023 are explained in detail.

At S1022, the CPU 4001 adjusts the inclination of the nail by changing the inclination of the entire finger by using the nail posture adjustment unit 340. Specifically, the second nail posture adjustment unit 340-2 on the side of the finger tip of the nail posture adjustment unit 340 lifts or lowers the finger fixing unit 330 (that is, the first nail posture adjustment unit 340-1 on the side of the finger bottom does not lift or lower the finger fixing unit 330). By rotating the finger fixing unit 330 and the nail integrally in this manner, the inclination in the height direction (Z-direction) of the tip side and the bottom side of the nail is adjusted. The inclination of the nail is measured by the nail information obtaining unit 200 and in a case where an appropriate inclination is obtained, the adjustment at this step is completed.

Figure 8B:
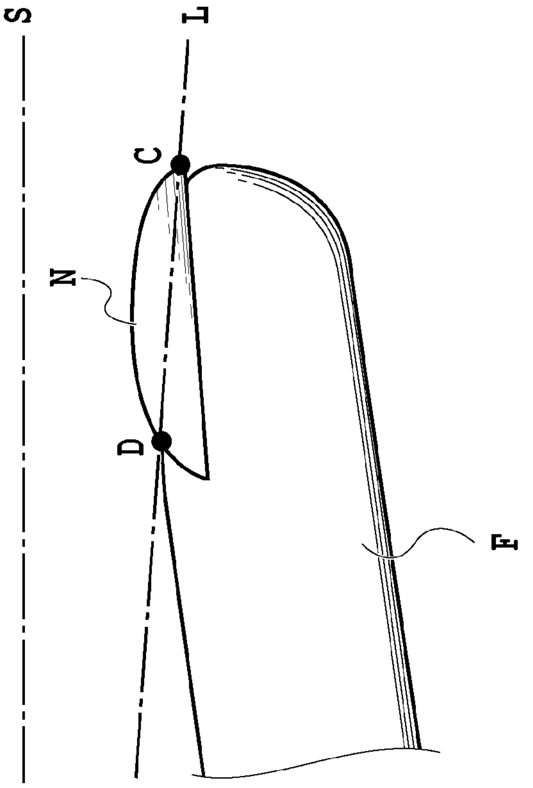
FIG. 8A and FIG. 8B are each an explanatory diagram of nail posture adjustment in the first embodiment.
Figure 8A:
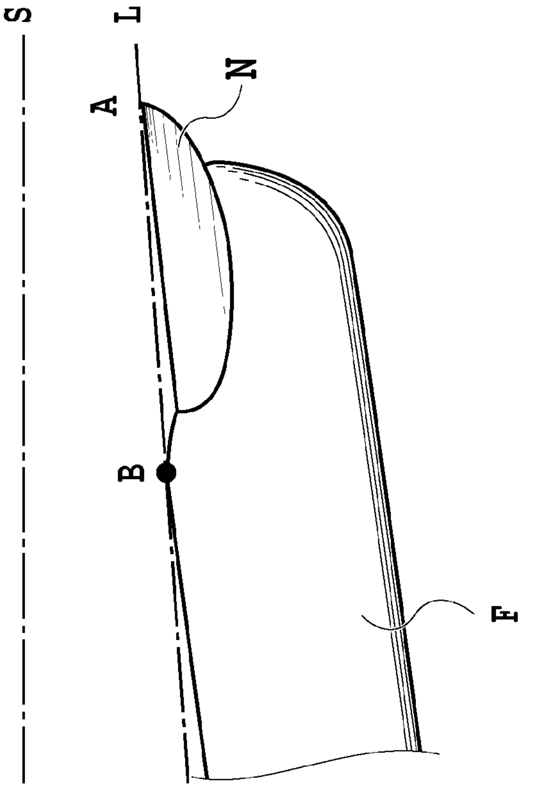

In the following, the appropriate inclination is explained specifically by using FIG. 8A and FIG. 8B. In order to put the entire nail in close proximity to the printing surface S, first, it is necessary to make an adjustment so that a reference line L connecting a nail's uppermost point A and a finger's uppermost point B and the printing surface S are parallel as shown in FIG. 8A. However, depending on the shape of finger or nail, it is supposed that there is a portion (of finger or nail) that protrudes upward in the Z-direction beyond the reference line after the adjustment. In the case such as this, the nail's uppermost point A, the finger's uppermost point B, and the reference line L are set again and the adjustment is made so that the reference line L and the printing surface S are parallel. By repeating this process, it is possible to achieve the posture in which the entire nail is put in close proximity to the printing surface in the range where the finger and the nail do not come into contact with the printing unit. Further, as shown in FIG. 8B, in a case where the shape of the entire nail is gradually convex, it is difficult to uniquely determine the nail's uppermost point. In the case such as this, the nail tip is taken to be C and the nail bottom is taken to be D and the inclination in the height direction of the tip side and the bottom side is adjusted so that the reference line L connecting C and D is parallel to the printing surface S. However, in this case, it is necessary to offset the portion that protrudes upward beyond the reference line L so that the portion does not come into contact with the printing unit 100 at the time of height adjustment at subsequent S1023.

At S1023, the CPU 4001 adjusts the nail height by using the nail posture adjustment unit 340. Specifically, the CPU 4001 adjusts the nail height by causing the first nail posture adjustment unit 340-1 and the second nail posture adjustment unit 340-2 respectively to lift or lower the finger fixing unit 330 to change the height of the entire finger. The nail height is measured by the nail information obtaining unit 200 and in a case where an appropriate height is obtained, the adjustment at this step is completed. At this step, the length in the Z-direction by which the first nail posture adjustment unit 340-1 lifts or lowers the finger fixing unit 330 and the length in the Z-direction by which the second nail posture adjustment unit 340-2 lifts or lowers the finger fixing unit 330 are equal. Further, the "appropriate height" described here refers to the height at which the reference line L shown at S1022 overlaps the printing surface S. However, in a case where there is a risk of contact between the nail and the printing unit, it may also be possible to offset the reference line L so that the reference line L lowers.

At S1024, the CPU 4001 determines whether it is possible to perform printing on the nail after the adjustment. The determination at this step is performed based on the information obtained by the nail information obtaining unit 200. In a case where the determination results at this step are affirmative, the nail posture adjustment processing is terminated and the processing advances to S103. On the other hand, in a case where the determination results at this step are negative, error processing, such as displaying information relating to the cause of printing impossibility, is performed. As examples of the case where it is not possible to perform printing, mention is made of a case where part of the finger or nail protrudes upward beyond the printing surface S, a case where the nail overlaps the finger fixing unit 330, and the like.

It may also be possible to perform the series of adjustment processing at step S102 in any order as long as it is possible to obtain the posture in which the entire nail is put in close proximity to the printing surface S in the range where the finger and nail of a user to not come into contact with the printing unit 100. For example, it may also be possible to perform the nail height adjustment prior to the nail inclination adjustment. Further, it may also be possible to use the finger fixing unit 330 as the determination reference at the time of adjustment, in addition to the finger and nail. Specifically, it may also be possible to use the height of the finger fixing unit 330 in place of the height of the finger's uppermost point B at S1022.

Effects of the Present Embodiment

As explained above, the printing apparatus of the present embodiment has the finger fixing unit and the nail posture adjustment unit and it is possible to adjust the inclination of the nail surface while fixing the finger by using those units.

Second Embodiment

In the present embodiment, the configuration of the hand placement unit is different from that of the printing apparatus in the first embodiment. In the following, different points between the present embodiment and the first embodiment are explained mainly and explanation of the common points is omitted appropriately. In the following explanation, for the same configuration as or the configuration corresponding to that of the first embodiment, the same symbol as that of the first embodiment is used.

<Hand Placement Unit 300>

Figure 9:
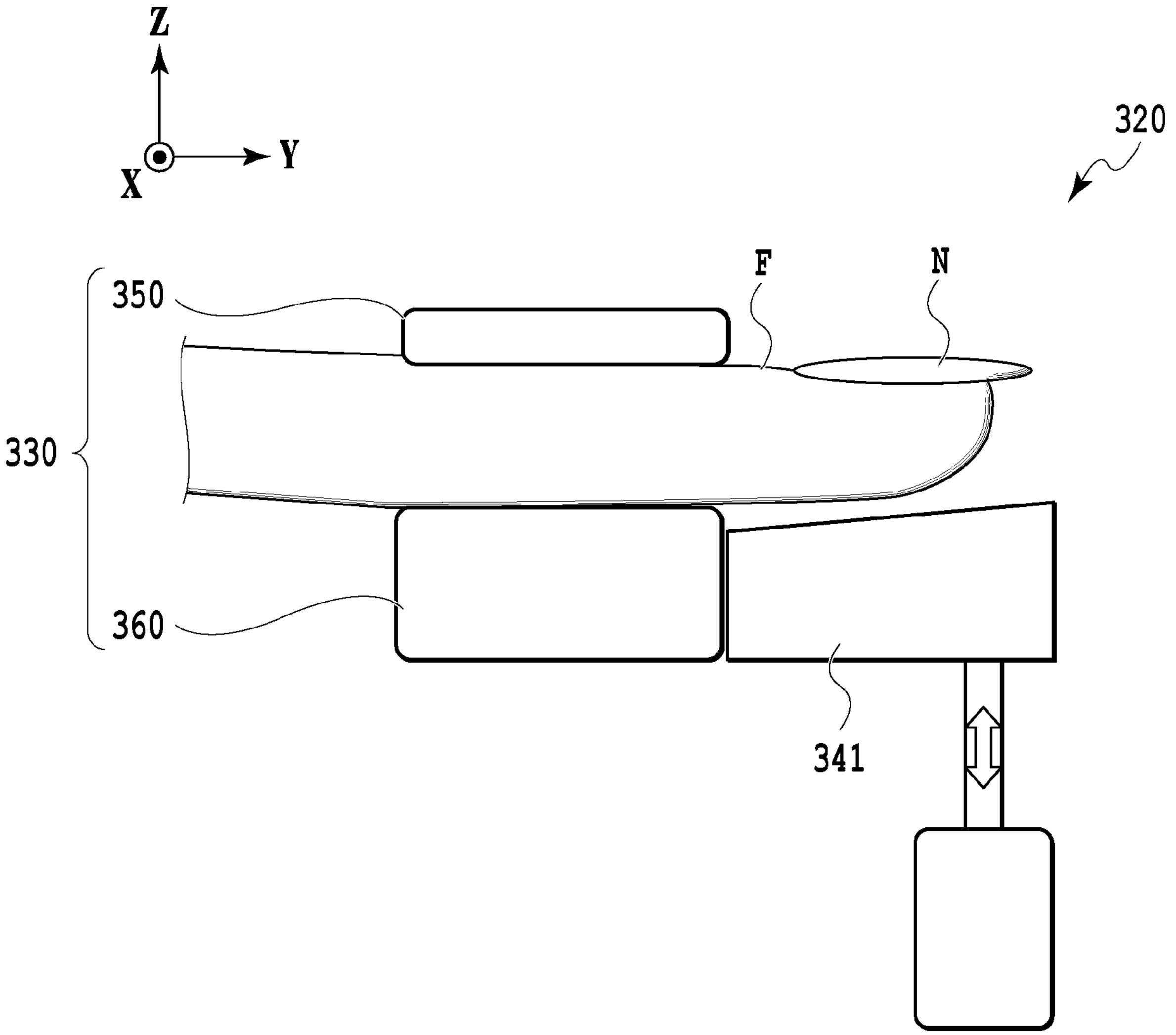
FIG. 9 is a schematic diagram showing a configuration of a finger placement unit in a second embodiment.
Figure 10:
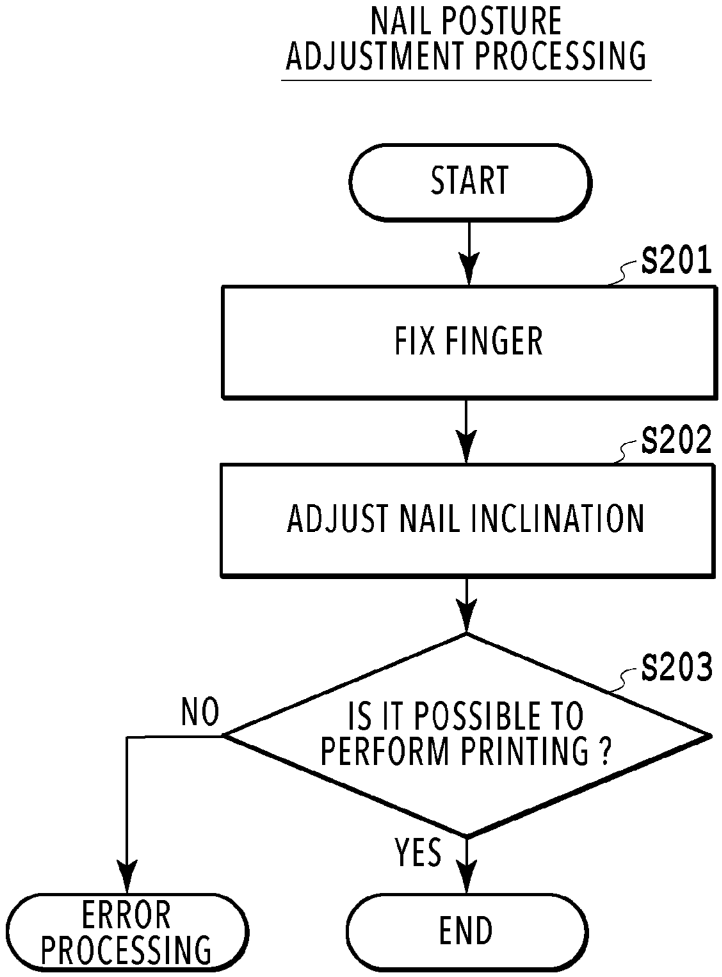
FIG. 10 is a flowchart of nail posture adjustment processing in the second embodiment.

The hand placement unit 300 is a mechanism for placing the printing medium H on the apparatus in a stable posture. The hand placement unit 300 according to the present embodiment has, as in the first embodiment, the palm placement unit 310 on which a hand is placed and the finger placement unit 320 on which a finger is placed. Further, as shown in FIG. 9, the finger placement unit 320 has the finger fixing unit 330 and a nail inclination adjustment unit 341.

The finger fixing unit 330 is a unit configured to fix a finger so that a printing-target nail does not move. Further, the finger fixing unit 330 according to the present embodiment has a role as a height reference and a rotational fulcrum at the time of the nail inclination adjustment unit 341, to be described later, adjusting the inclination of a nail. The finger fixing unit 330 has a finger pressing unit 350 and a finger pushing-up unit 360. The finger pressing unit 350 is a member that comes into contact with part of the area except for the nail of the area on the side of the fingernail. The portion at which the finger pressing unit 350 comes into contact with the finger is located in the vicinity of the printing surface S and by the finger coming into contact with the finger pressing unit 350, it is possible to adjust the finger and nail height to the height suitable to printing of the nail. The finger pushing-up unit 360 is a unit configured to cause the finger to come into contact with the finger pressing unit 350. It is necessary for the finger pushing-up unit 360 configured to push up the finger to be fixed to push up the finger with a force that does not cause a pain of the finger. It is desirable to use an elastic member for the finger pushing-up unit 360. Further, it is desirable for the finger fixing unit 330 to fix the finger at a portion close to the nail at the time of fixing the finger in order to prevent the nail from moving during printing.

Figure 11A:
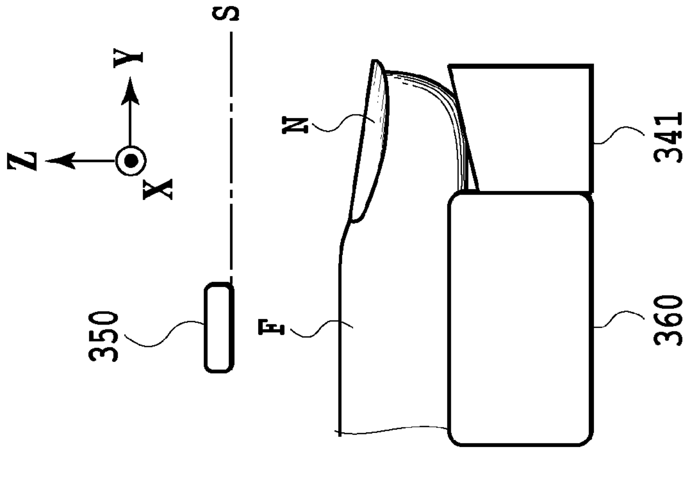
FIG. 11A to FIG. 11C are each an explanatory diagram of nail posture adjustment in the second embodiment.
Figure 11B:
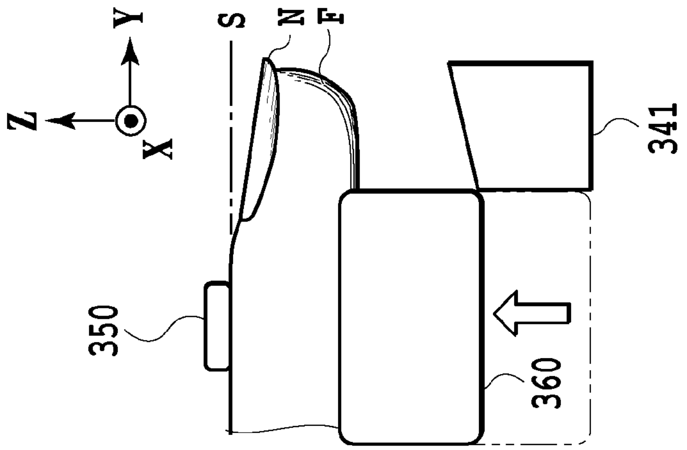
Figure 11C:
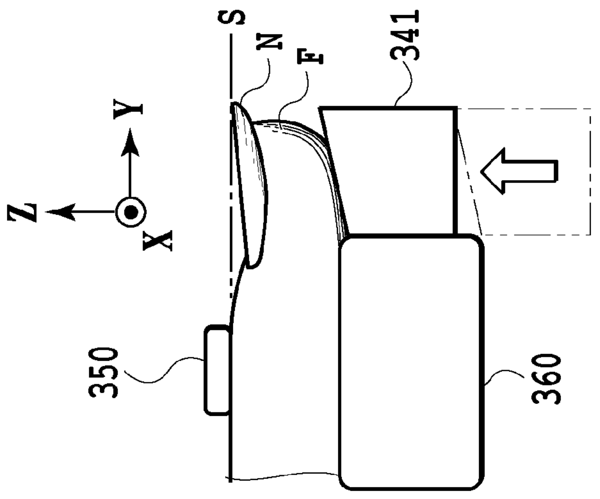

The nail inclination adjustment unit 341 is a unit configured to adjust the inclination of the nail of the finger fixed by the finger fixing unit 330 and arranged on the side closer to the fingertip than the finger fixing unit 330. The nail inclination adjustment unit 341 has a fingertip placement unit on which a fingertip is placed and a fingertip lifting/lowering unit capable of lifting/lowering the fingertip placement unit. The nail inclination adjustment unit 341 adjusts the nail inclination based on the nail information obtained by the nail information obtaining unit 200 described previously. The nail inclination adjustment unit 341 has a role of moving the fingertip at least in the Z-direction and is driven by a motor, not shown schematically. In the present embodiment, as shown in FIG. 11C, the nail inclination adjustment unit 341 adjusts the nail inclination so that the height of the nail tip is equal to the height of the printing surface S by using the finger pressing unit 350 as a rotational fulcrum. However, it may also be possible to change the nail inclination adjustment sequence in accordance with the shape of the finger and nail and further, it is desirable to adjust the posture of the finger and nail to a suitable posture in accordance with the printing unit 100.

<Nail Posture Adjustment Processing>

Figure 6:
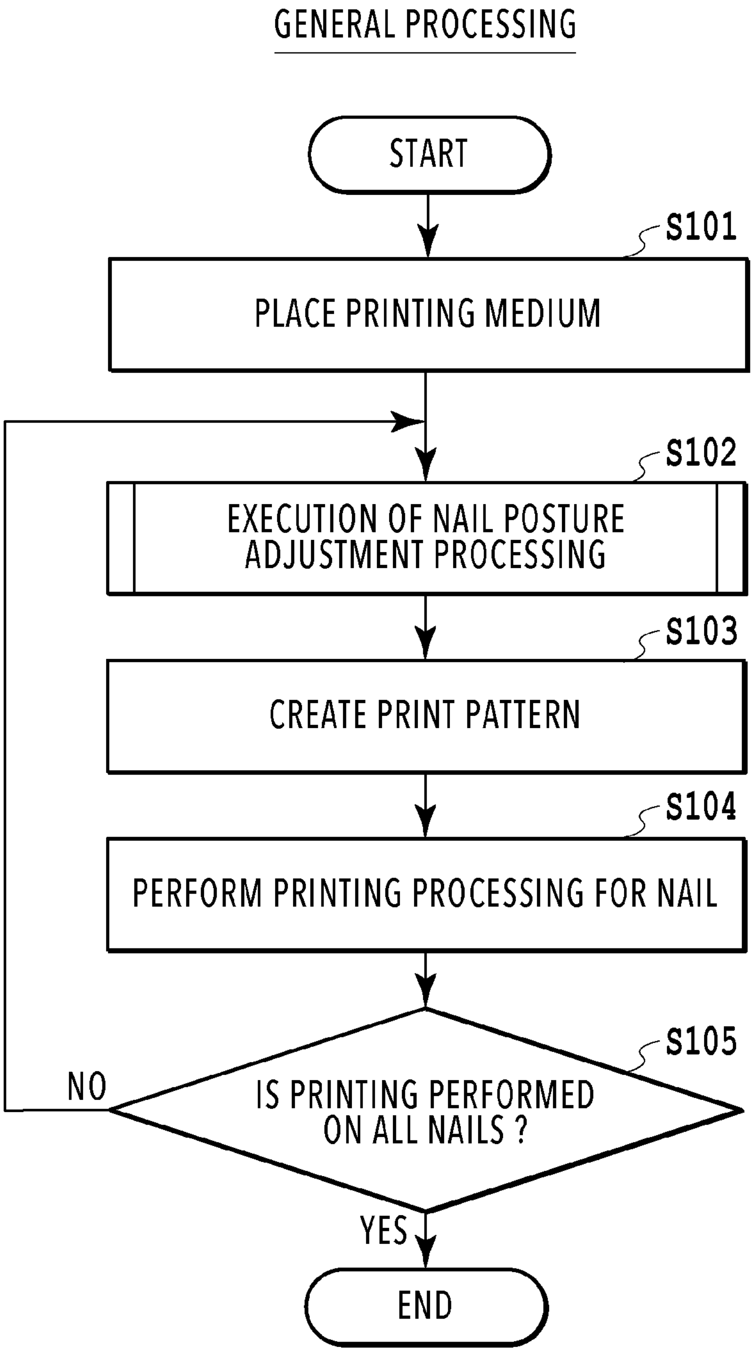
FIG. 6 is a flowchart of nail printing processing in the first embodiment.
Figure 7:
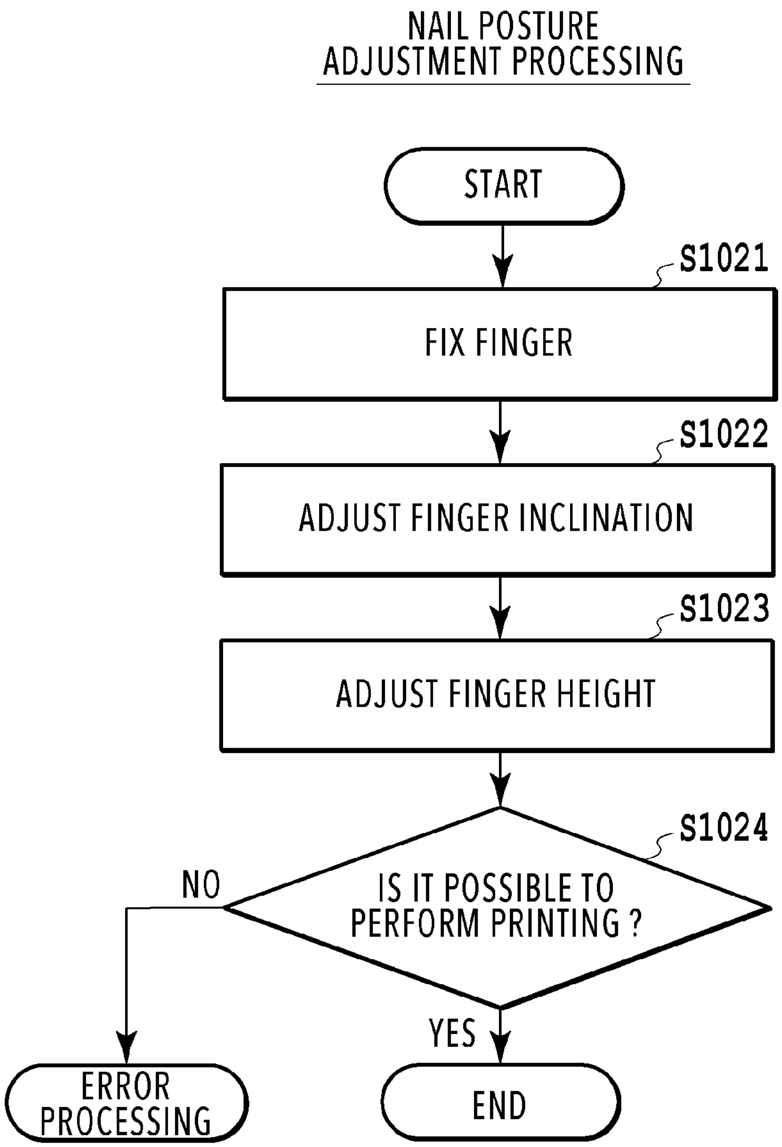
FIG. 7 is a flowchart of nail posture adjustment processing in the first embodiment.

The nail printing processing in the present embodiment is the same as that in the first embodiment (see FIG. 6). Consequently, in the following, details of the nail posture adjustment processing (S102 in FIG. 6) in the present embodiment are explained by using FIG. 10 and FIG. 11A to FIG. 11C.

At S201, a user fixes a finger by the finger fixing unit 330 described previously. Specifically, the user fixes the finger by, after placing the finger on the finger pushing-up unit 360, lifting the finger pushing-up unit 360 and causing the finger to come into contact with the finger pressing unit 350. Alternatively, it may also be possible to fix the finger by bringing about the state in advance where the finger is in contact with the finger pressing unit 350 and then lifting the finger pushing-up unit 360. In order to fix the finger firmly, it is desirable to fix the finger up to beyond the first joint. Further, as the fixing member, it is desirable to use an elastic member, a fluid and the like to avoid a pain of a user. In a case where a hard fixing member is used, it is possible to mitigate the pain of the user by providing a curvature in accordance with the shape of the finger to the placement surface. Further, in the present embodiment, as shown in FIG. 11A to FIG. 11C, by providing the finger pressing unit 350 as the height reference, it is possible to perform the fixation and the height adjustment of the finger at the same time.

At S202, the CPU 4001 adjusts the nail inclination so that the posture is appropriate for printing by lifting the nail inclination adjustment unit 341 to change the inclination of the fingertip. The “appropriate posture” described here means the posture in which the entire nail is put in close proximity to the printing surface S in the range where the finger and the nail do not come into contact with the printing unit 100. The inclination of the nail is measured by the nail information obtaining unit 200 and in a case where an appropriate inclination is obtained, the adjustment at this step is completed. In the present embodiment, the finger fixing unit 330 has the height reference, and therefore, as shown in FIG. 11C, it is made possible for the nail's uppermost point to easily reach the printing surface S after the height adjustment. As a result of the adjustment at this step, the nail inclination becomes an inclination suitable to printing.

At S203, the CPU 4001 determines whether it is possible to perform printing on the nail after the adjustment. This step is the same as that of the first embodiment (S1204 in FIG. 7).

Effects of the Present Embodiment

As explained above, the printing apparatus of the present embodiment has the finger fixing unit and the nail inclination adjustment unit and it is possible to adjust the inclination of the nail surface while fixing the finger by using those units.

Third Embodiment

In the present embodiment, the configuration of the hand placement unit is different from that of the printing apparatus in the embodiments described previously. In the following, different points between the present embodiment and the embodiments described previously are explained mainly and explanation of the common points is omitted appropriately. In the following explanation, for the same configuration as or the configuration corresponding to that of the embodiments described previously, the same symbol as that of the embodiments described previously is used.

<Hand Placement Unit 300>

The hand placement unit 300 is a mechanism for placing the printing medium H on the apparatus in a stable posture. The hand placement unit 300 in the present embodiment also has, as in the embodiments described previously, the palm placement unit 310 on which a hand is placed and the finger placement unit 320 on which a finger is placed. Further, as shown in FIG. 12, the finger placement unit 320 has the finger fixing unit 330 and the nail inclination adjustment unit 341.

Figure 12:
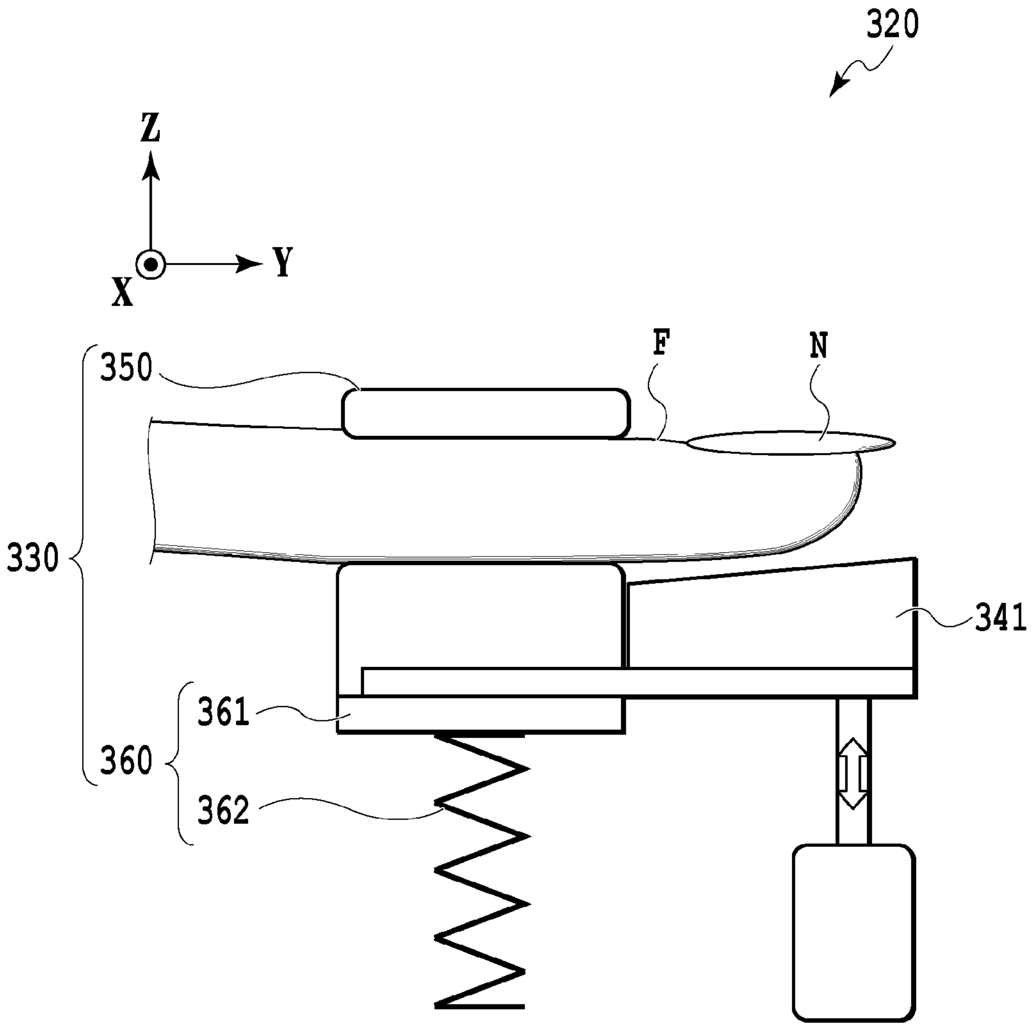
FIG. 12 is a schematic diagram of a configuration of a finger placement unit in a third embodiment.
Figure 13C:
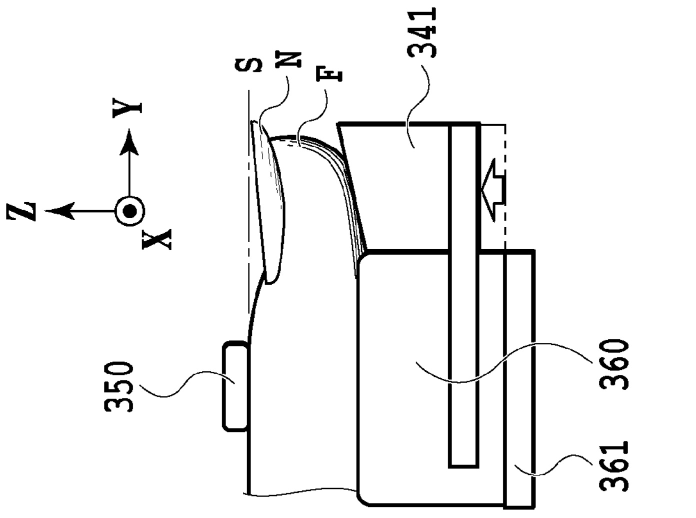
FIG. 13A to FIG. 13C are each an explanatory diagram of nail posture adjustment in the third embodiment.
Figure 13B:
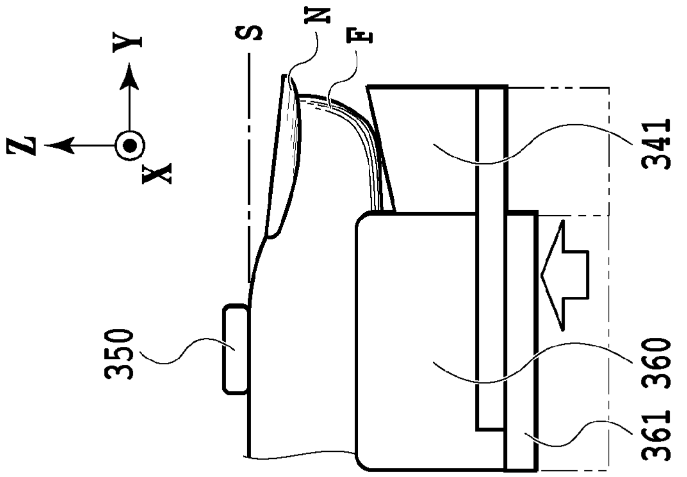
Figure 13A:
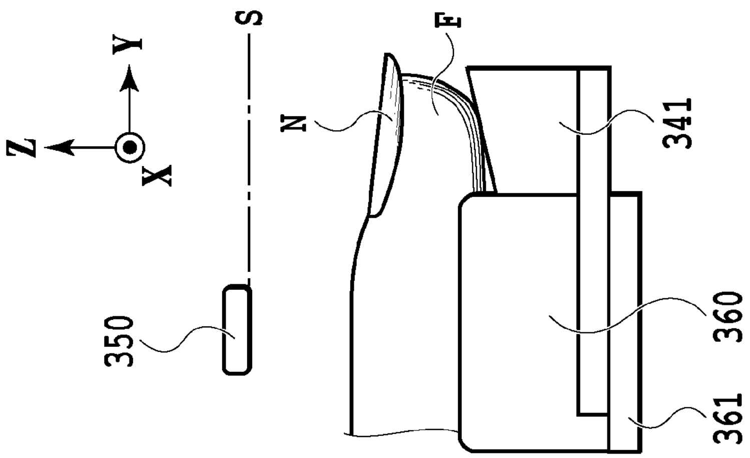

As shown in FIG. 12, the finger fixing unit 330 has the finger pressing unit 350 and the finger pushing-up unit 360. The finger pushing-up unit 360 has an abutting member 361 that abuts the nail inclination adjustment unit and a biasing unit 362. By these units, as shown in FIG. 13B, the finger pushing-up unit 360 lifts and lowers in an interlocking manner with the nail inclination adjustment unit 341. Then, after the finger comes into contact with the finger pressing unit 350, the finger pushing-up unit 360 separates from the nail inclination adjustment unit 341 that continues to lift. The operation of the nail inclination adjustment unit 341 after the separation is the same as that in the second embodiment as shown in FIG. 13C.

Effects of the Present Embodiment

As explained above, the printing apparatus of the present embodiment has the finger fixing unit and the nail inclination adjustment unit and further, the finger fixing unit and the nail inclination adjustment unit lift and lower in an interlocking manner. Due to these, it is possible to adjust the inclination of the nail surface while fixing the finger.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide the technique to adjust the inclination of the nail surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064094, filed Apr. 5, 2021, which is hereby incorporated by reference herein in its entirety.

What is claimed is:

1. A nail printing apparatus that prints an image on a nail, the nail printing apparatus comprising:
- a finger placement unit capable of lifting and lowering on which a finger corresponding to the nail is placed, with the finger placement unit having a fixing unit configured to fix the finger, and the fixing unit including:
  - a pressing unit configured to cover at least a part of the finger; and
  - a pushing-up unit configured to push up the finger until the finger comes into contact with the pressing unit; and
- an adjustment unit configured to adjust an inclination in a height direction of a tip side and a bottom side of a surface of the nail corresponding to the finger placed on the finger placement unit, with the adjustment unit including:
  - a fingertip placement unit arranged on a side closer to a fingertip than the fixing unit; and
  - a fingertip lifting/lowering unit configured to lift/lower the fingertip placement unit.

2. The nail printing apparatus according to claim 1, wherein
- the adjustment by the adjustment unit is performed by changing an inclination of an entire finger or an inclination of a fingertip.

3. The nail printing apparatus according to claim 1, wherein
- the adjustment unit rotates the fixing unit and the finger integrally.

4. The nail printing apparatus according to claim 1, wherein
- the pressing unit is biased by the fingertip placement unit.

5. The nail printing apparatus according to claim 1, wherein
- the adjustment unit stops its operation or lowers in a case where an amount of load imposed on the finger exceeds a predetermined threshold value.

6. The nail printing apparatus according to claim 1, further comprising:
- a finger insertion reference for placing the finger at an appropriate position.

7. The nail printing apparatus according to claim 6, further comprising:
- a detection unit configured to detect that the finger is inserted up to the finger insertion reference.

8. The nail printing apparatus according to claim 1, further comprising:
- an obtaining unit configured to obtain the nail height information, wherein
- the finger placement unit lifts or lowers based on the height information.

9. The nail printing apparatus according to claim 1, further comprising:
- a printing unit configured to print an image on a nail whose inclination has been adjusted by the adjustment unit.

10. The nail printing apparatus according to claim 1, wherein the finger placement unit is grounded.

11. A control method of a nail printing apparatus that prints an image on a nail, the control method comprising the steps of:

adjusting a height of the nail;

covering at least a part of the finger with a pressing unit;

pushing up the finger until the finger comes into contact with the pressing unit;

adjusting an inclination in a height direction of a tip side and a bottom side of a surface of the nail;

arranging a fingertip placement unit on a side closer to a fingertip than the pressing unit; and adjusting a height of the fingertip placement unit.

* * * * *